(12) United States Patent
Wang et al.

(10) Patent No.: US 10,532,628 B2
(45) Date of Patent: Jan. 14, 2020

(54) HVAC MODULE HAVING A RECONFIGURABLE BI-LEVEL DUCT SYSTEM

(71) Applicant: MAHLE International GmbH, Stuttgart (DE)

(72) Inventors: Mingyu Wang, Amherst, NY (US); Yanping Xia, Williamsville, NY (US); Wen Liu, Pendleton, NY (US); Prasad S. Kadle, Williamsville, NY (US); Jeffrey C. Kinmartin, East Amherst, NY (US)

(73) Assignee: MAHLE International GmbH, Stuttgart (DE)

( * ) Notice: Subject to any disclaimer, the term of this patent is extended or adjusted under 35 U.S.C. 154(b) by 615 days.

(21) Appl. No.: 14/704,076

(22) Filed: May 5, 2015

(65) Prior Publication Data

US 2016/0325599 A1 Nov. 10, 2016

(51) Int. Cl.
*B60H 1/00* (2006.01)

(52) U.S. Cl.
CPC ..... *B60H 1/00564* (2013.01); *B60H 1/00035* (2013.01); *B60H 1/00664* (2013.01); *B60H 2001/00185* (2013.01); *B60H 2001/00721* (2013.01)

(58) Field of Classification Search
CPC ........ B60H 1/34; B60H 1/00; B60H 1/00564; B60H 1/00035; B60H 1/00664; B60H 2001/00185; B60H 2001/00721; B60J 7/22; H01R 4/185; H01R 4/188; H01R 13/6581; H01R 13/514

USPC ................. 296/24.3, 208; 454/160, 129, 261
See application file for complete search history.

(56) References Cited

U.S. PATENT DOCUMENTS

| 3,656,541 | A | * | 4/1972 | Coyle | B60H 1/00007 165/203 |
| 3,901,275 | A | * | 8/1975 | Logsdon | F16K 11/052 137/599.03 |
| 4,368,843 | A | * | 1/1983 | Kai | B60H 1/00842 165/204 |
| 4,482,009 | A | * | 11/1984 | Nishimura | B60H 1/00842 165/203 |

(Continued)

FOREIGN PATENT DOCUMENTS

| EP | 1 005 106 A2 | 5/2000 |
| EP | 2 779 176 A2 | 9/2014 |
| WO | 2013/066512 A1 | 5/2013 |

*Primary Examiner* — Steven B McAllister
*Assistant Examiner* — Allen R Schult
(74) *Attorney, Agent, or Firm* — Brinks Gilson & Lione

(57) ABSTRACT

An HVAC module having a reconfigurable bi-level duct system is disclosed. The air duct includes an air duct inlet in fluid communication with the HVAC module, an interior wall dividing the air duct into first and second air passageways, a bypass port enabling fluid communication between the first air and second air passageways. A downstream control valve disposed adjacent the bypass port and is configured to selectively direct air flow from one of the first and second air passageways to the other of the first and second air passageways. An upstream flow control valve is disposed adjacent to the inlet of the air duct, wherein the upstream flow control valve is configured to selectively direct air flow from the hot and cold chambers of the HVAC module to the first and second air passageways of the air duct.

18 Claims, 5 Drawing Sheets

(56) References Cited

U.S. PATENT DOCUMENTS

| | | | | |
|---|---|---|---|---|
| 4,537,245 A * | 8/1985 | Nishimura | B60H 1/00842 | 165/203 |
| 4,759,269 A * | 7/1988 | Brown | B60H 1/00842 | 165/217 |
| 4,828,018 A * | 5/1989 | Hoffman | B60H 1/00007 | 165/42 |
| 5,186,237 A * | 2/1993 | Adasek | B60H 1/00064 | 165/101 |
| 5,505,251 A * | 4/1996 | Sarbach | B60H 1/0005 | 165/202 |
| 6,152,522 A * | 11/2000 | Boulay | B60H 1/247 | 296/208 |
| 6,206,092 B1 * | 3/2001 | Beck | B60H 1/00064 | 165/203 |
| 6,368,207 B1 * | 4/2002 | McLaughlin | B60H 1/0005 | 454/156 |
| 6,547,301 B1 * | 4/2003 | Keller | B60H 1/0055 | 165/42 |
| 6,715,814 B1 * | 4/2004 | Hoyle | B60H 1/0055 | 296/208 |
| 6,739,149 B2 * | 5/2004 | Kang | B60H 1/00064 | 165/42 |
| 7,174,918 B2 * | 2/2007 | Stevenson | B60H 1/00692 | 137/883 |
| 2006/0000592 A1 * | 1/2006 | Bosquet | B60H 1/00021 | 165/202 |
| 2007/0044383 A1 * | 3/2007 | Marshall | B60H 1/00664 | 49/478.1 |
| 2007/0128997 A1 * | 6/2007 | Prince | B60H 1/00564 | 454/129 |
| 2008/0032618 A1 * | 2/2008 | Katoh | B60H 1/00564 | 454/143 |
| 2008/0200110 A1 * | 8/2008 | Ghosh | B60H 1/00671 | 454/160 |
| 2011/0100034 A1 * | 5/2011 | Baker | B60H 1/00821 | 62/89 |
| 2016/0361977 A1 * | 12/2016 | Freese | B60H 1/00678 | |
| 2017/0217284 A1 * | 8/2017 | Ji | B60H 1/00821 | |

* cited by examiner

HVAC MODULE HAVING A RECONFIGURABLE BI-LEVEL DUCT SYSTEM

TECHNICAL FIELD OF INVENTION

The invention relates to a heating, ventilation and air conditioning (HVAC) module for a passenger vehicle; more specifically, to an HVAC module having a duct system for supplying air to the rear zones of the passenger vehicle.

BACKGROUND OF THE INVENTION

Traditional motor vehicles typically have a single temperature-controlled zone air conditioning system designed to provide conditioned air to the front occupants in the passenger compartment of the vehicle. As the size of the vehicles increases, and as vehicle occupants demand more luxurious features, air conditioning systems capable of providing multiple temperature-controlled zones, or multi-zone air conditioning systems, have become more prevalent. A multi-zone air conditioning system allows the driver, front passenger, and even the rear seat passengers to have separate controls of the temperature and airflow in their respective zone, thereby maximizing the comfort of the occupants in each zone. A larger size vehicle, such as sport utility vehicles (SUV) and mini-vans, may have up to four or more individual zones in the passenger compartment. As an example, the passenger compartment of a mini-van may be divided into four separate zones, where the driver space may be zone 1, the front passenger space may be zone 2, the second row seating space may be zone 3, and the third row seating space may be zone 4.

Traditional heating, ventilation and air conditioning (HVAC) modules for single zone air conditioning systems are generally designed to optimally utilize the amount of available space in a given type of vehicle as well as to conform to the shape of that space. HVAC modules that have the capability of providing temperature control for multiple zones are specifically designed, tooled, and manufactured for the exact number of zones. The production volume for multiple zone HVAC modules is typically much lower than that for single or dual zone modules. As such, it is much more expensive to design such a multiple zone HVAC module for so few vehicles. Additionally, it would be disruptive to the manufacturing cell and the manufacturing process in general to be forced to build an entirely different HVAC module to achieve an additional temperature-controlled zone.

Traditional multiple zone HVAC modules use partition walls extending up to the individual heat exchangers within the HVAC module to provide multiple streams of conditioned airflow. These multiple streams of airflow are used to achieve multi-zone climate control in the associated passenger compartments. The greater the number of zones, the greater number of partition walls are required, and the larger the sizes of heat exchangers are required. However, multiple zone HVAC modules must conform to the limited size and shape of a where a single zone HVAC module would be in place, thereby requiring additional functions to be added without utilizing any extra space. Due to operating capacity and packaging constraints, two separate dual HVAC modules are occasionally employed in larger vehicles to achieve multi-zone operation, where a two zone module is installed in the area of the vehicle dash and another, one or two-zone, HVAC module in the area of the trunk.

However, implementation of the traditional, partitioned, dual HVAC modules, one under the dash and the other in the trunk, is cumbersome and costly. For example, dual HVAC modules can require excessive packaging space in the host vehicle, additional air ducts, additional lines and fittings, additional refrigerant, additional coolant, additional mass, higher operating noise levels, higher cost and increased system complexity that often translates into elevated quality and warranty issues. Such systems require additional energy and larger supporting components such as compressors, water pump, condenser, alternator, line sets, and ducts. As a consequence, the dual module approach results in increased vehicle fuel consumption and increased exhaust emissions. All of these items significantly contribute to overall vehicle cost and operating costs.

U.S. application Ser. No. 14/685,933 filed on Apr. 14, 2015, discloses a HVAC module capable of providing multiple temperature-controlled zones for a passenger vehicle, in which the HVAC module is sufficiently compact to reside within the dash of the vehicle. It is known to use a single airflow duct to convey conditioned air into each rear zone at the same discharge temperature. This is perfectly acceptable for the heating mode, where air is discharged to the floor outlets, and for the vent mode, where cool air is discharged to the chest level ventilation outlets. However, for bi-level mode of delivery, which requires the vent outlet to delivery slightly cooler air and the heater outlet to deliver slight warmer air, the prior art ducting system is unable to meet such a requirement and can only deliver air streams at the same temperature into the vent outlet and the heater outlet.

SUMMARY OF THE INVENTION

The present disclosure provides an HVAC module having a reconfigurable bi-level duct system. The HVAC module defines a cold air chamber, a hot air chamber, an air mix chamber in fluid communication with the cold and hot air chambers, and an air outlet downstream of the air mix chamber. A blend valve is disposed in the air mix chamber and is configured to selectively direct airflow from the cold and hot air chambers to the air outlet. The bi-level duct system includes an air duct having an air duct inlet in fluid communication with the air outlet of the HVAC module. The air duct includes an interior wall dividing the air duct into a first air passageway and a second air passageway. A bypass port is defined in the interior wall, wherein the bypass port enables fluid communication between the first air passageway and the second air passageway. A downstream control valve is disposed adjacent to the bypass port, wherein the downstream control valve is configured to selectively direct air flow from one of the first and second air passageways to the other of the first and second air passageways. An upstream flow control valve is disposed adjacent to the inlet of the air duct, wherein the upstream flow control valve is configured to selectively direct air flow from the outlet of the HVAC module to the first and second air passageways of the air duct.

Advantages of the improved HVAC module includes, but not limited to, capable of bi-level mode of delivery, whereas capable of utilizing both air passageways for single mode delivery with reduced duct resistance. In the bi-level mode, it enables cooler air being delivered to the vent outlet and warmer air to the heater outlet.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1A shows a schematic cross-section of the HVAC module of FIG. 1 along the line I-I.

DETAILED DESCRIPTION

The following documents are hereby incorporated by reference in their entireties to describe the making and using of an HVAC module: U.S. Pat. No. 7,832,464 B2 to Kinmartin et al. entitled "Flexible Module with Add-On Multi-Zone Sub-Assembly"; U.S. Pat. No. 7,174,918 B2 to Stevenson et al. entitled "Air Flow Control Valve for Vehicle Air Conditioning Module"; U.S. Pat. No. 6,772,822 B2 to Auer et al. entitled "HVAC with Modular Inserts"; U.S. Pat. No. 6,547,152 B1 to Pawlak III entitled "Vehicle Heating Ventilation and Air-Conditioning Module for Improved Heating and Defrosting Performance"; U.S. Pat. No. 6,368,207 B1 to McLaughlin et al. entitled "Automotive Heating, Ventilating and Air Conditioning Module with Improved Air Mixing"; U.S. Pat. No. 5,983,657 to Murata et al. entitled "Air Conditioning System"; U.S. Pat. No. 5,228,475 to Trill entitled "Air Flow Control Valve for a HVAC Module"; and U.S. patent application Ser. No. 14/685,933 entitled "An HVAC Module having an Open Architecture".

Shown in FIGS. 1-4 is an embodiment of an HVAC module 200 having a reconfigurable bi-level duct system 300. Shown in FIG. 5 is an HVAC module 200 having an alternative embodiment of a bi-level duct system 300. Where practical, reference numbers for like components are commonly used amongst FIGS. 1-5. It should be noted that the terms "upper" and "lower" are not meant to be limiting, but are used to reference the locations of the features with respect to the drawings.

Figure 1:
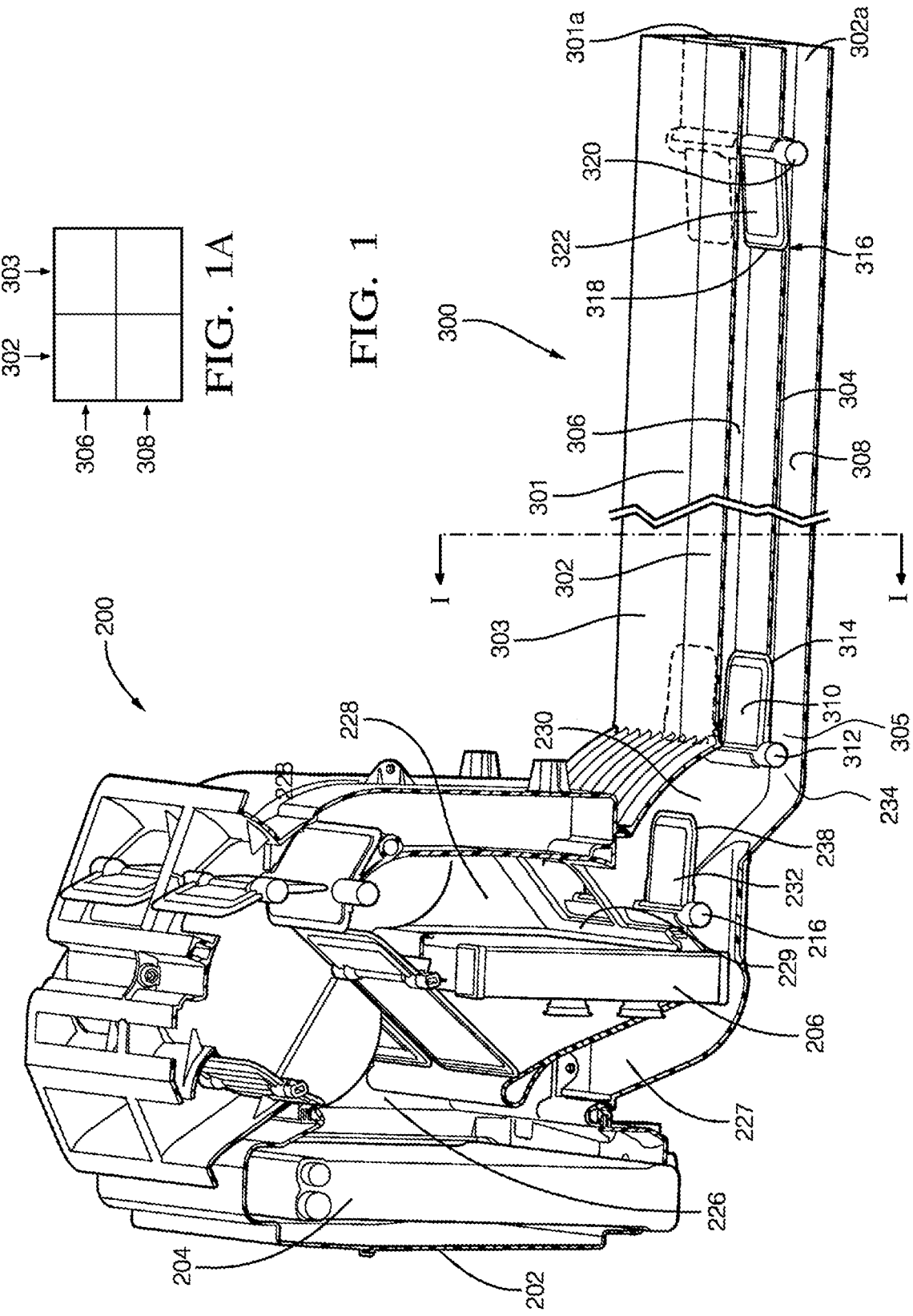
FIG. 1 is perspective partially cutaway view of the HVAC module having a bi-level duct system.

Shown in FIG. 1 is a perspective view of an HVAC module 200 having a bi-level duct system 300 configured to deliver bi-level conditioned air to the rear passenger zones of a passenger vehicle. The bi-level duct system 300 includes a main duct 300 partitioned into a first air duct 302 and a second air duct 303. The first air duct 302 delivers conditioned air to a first rear passenger zone, such as the passenger space behind the driver's seat, and the second air duct 303 delivers conditioned air to a second rear passenger zone, such as the passenger space behind the front passenger seat. For additional comfort for the occupants of the zones, each of the first and second air ducts 302, 303 are partitioned in to a first passageway 306 and a second passageway 308. The first passageways 306 deliver conditioned air to a lower portion of the rear passenger zones, such as near the feet of a passenger, and the second passageways 308 deliver conditioned air to an upper portion of the rear passenger zones, such as near the chest or face of a passenger. One or both of the first and second air ducts 302, 303 may include features, which are described in detail below, to cooperate with the features of the HVAC module 200 for simultaneously supplying different temperature air to the lower and upper portions of a particular rear zone, or for the super heating or super cooling of the lower or upper portions. While the main duct 301 is shown to be divided into a first air duct 302 and a second air duct 303 to deliver conditioned air to two separate rear zones, those skill in the art, based on the teaching of this specification, will appreciate that the main duct 301 may be sized and further divided to provide conditioned air to a greater number of rear zones.

Figure 2:
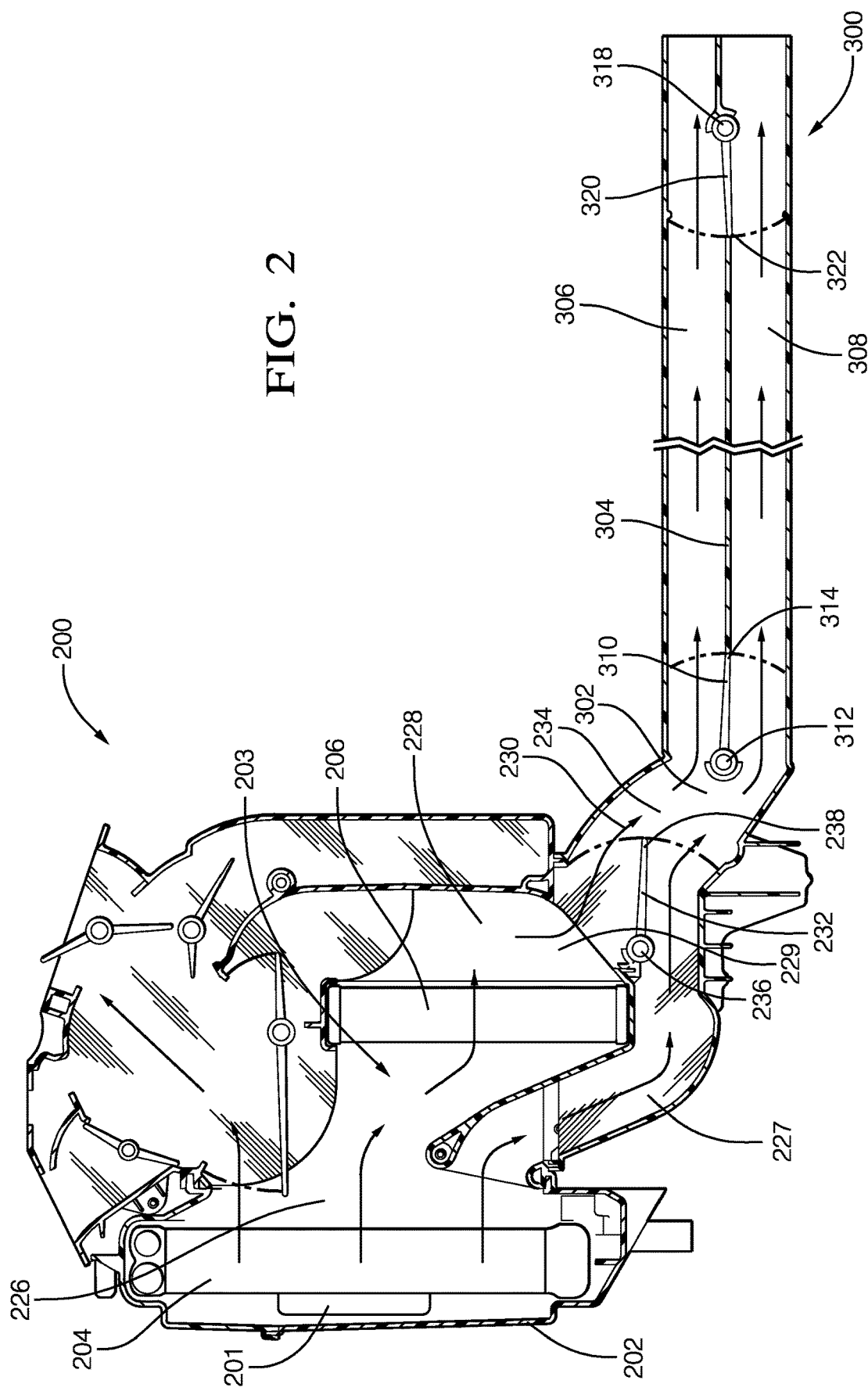
FIG. 2 is a cross-sectional view of a HVAC module having a bi-level duct system, where a majority portion of hot air flow is routed through a first passageway and a majority portion of cold air flow is routed through a second passageway.
Figure 3:
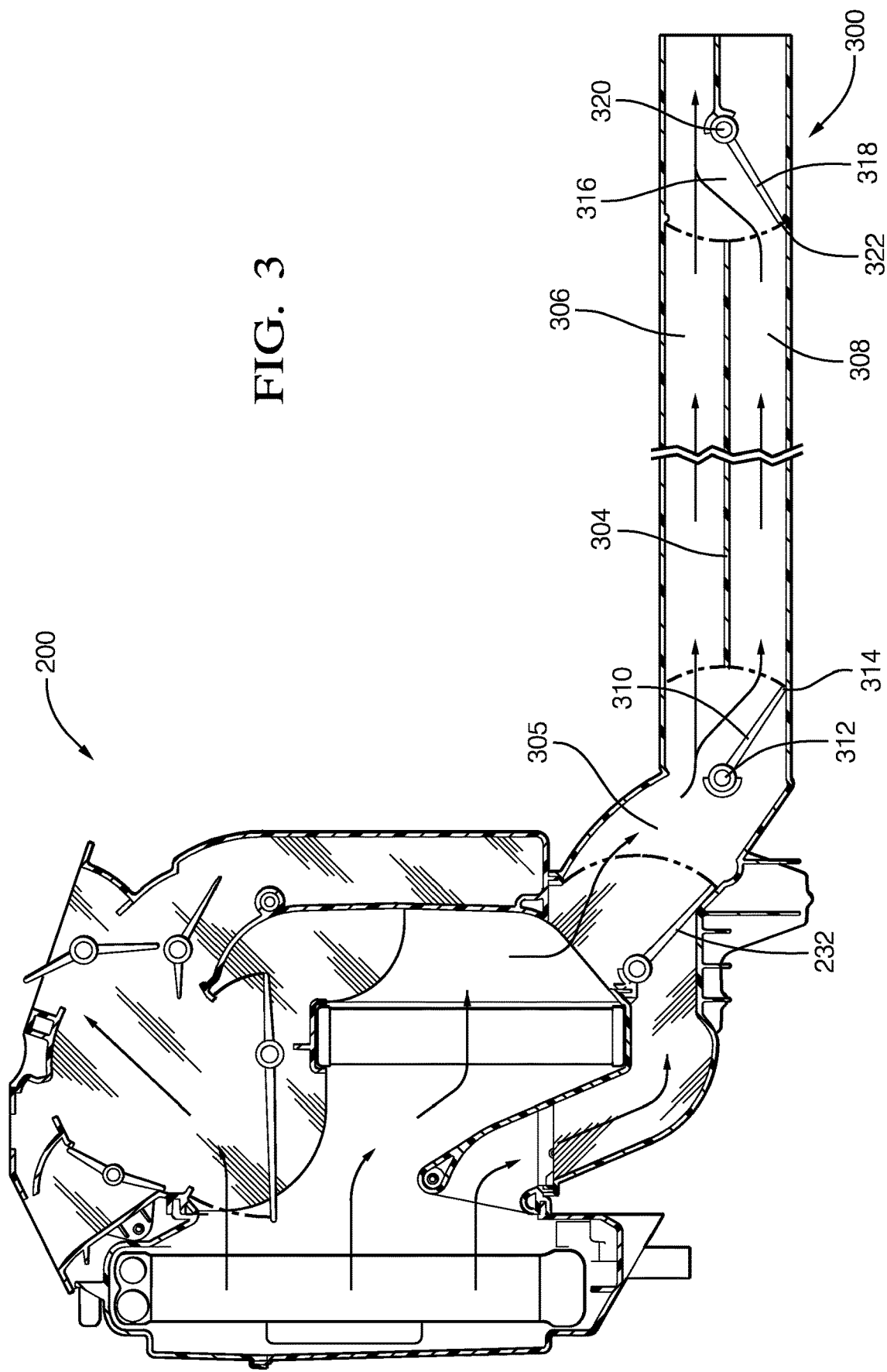
FIG. 3 is a cross-sectional view of the HVAC module having a bi-level duct system of FIG. 1, where 100 percent of hot air flow is routed through both passageways to a first outlet.
Figure 4:
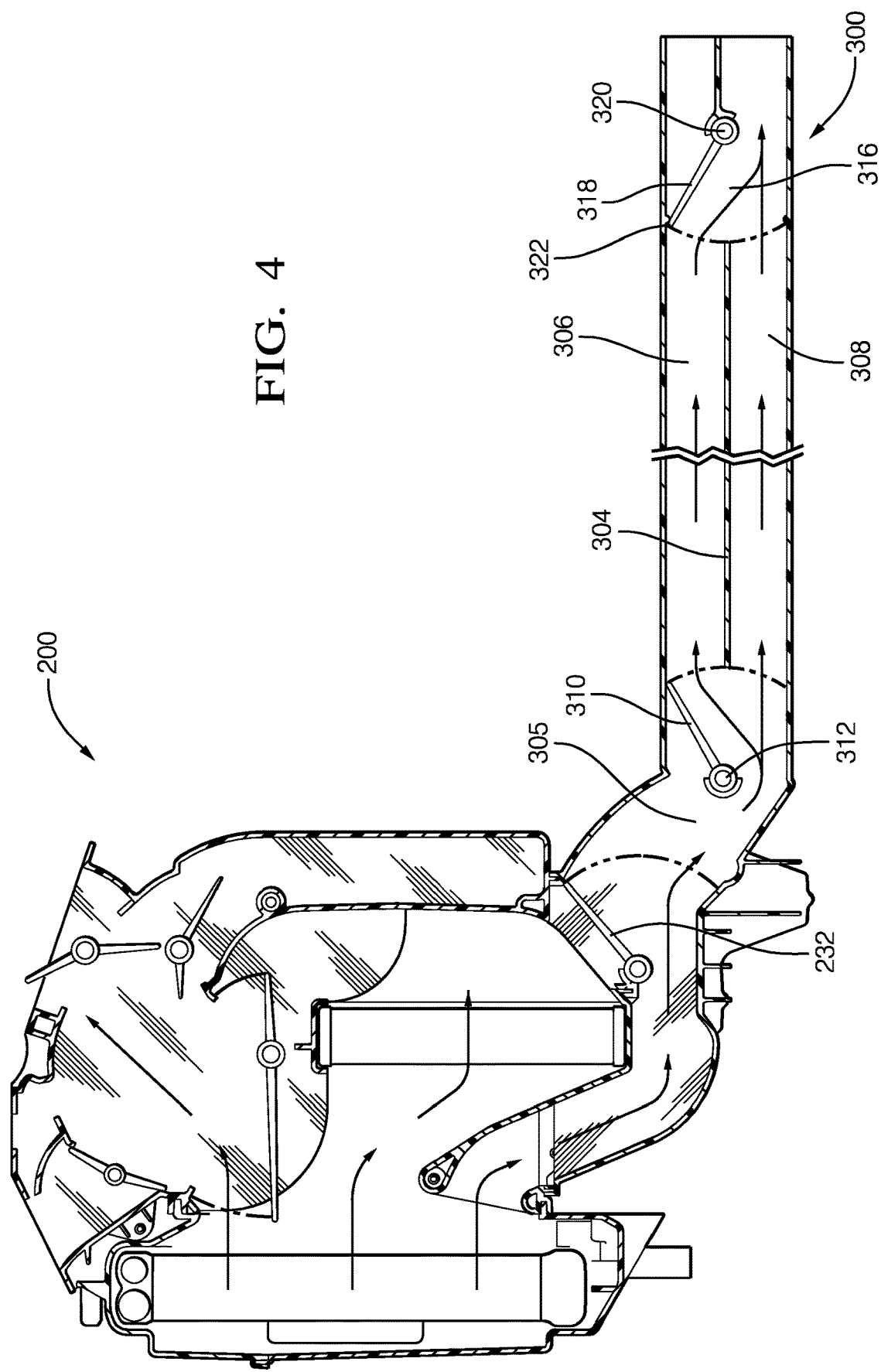
FIG. 4 is a cross-sectional view of the HVAC module having a bi-level duct system of FIG. 1, where 100 percent of cold air flow is routed through both passageways to a second outlet.
Figure 5:
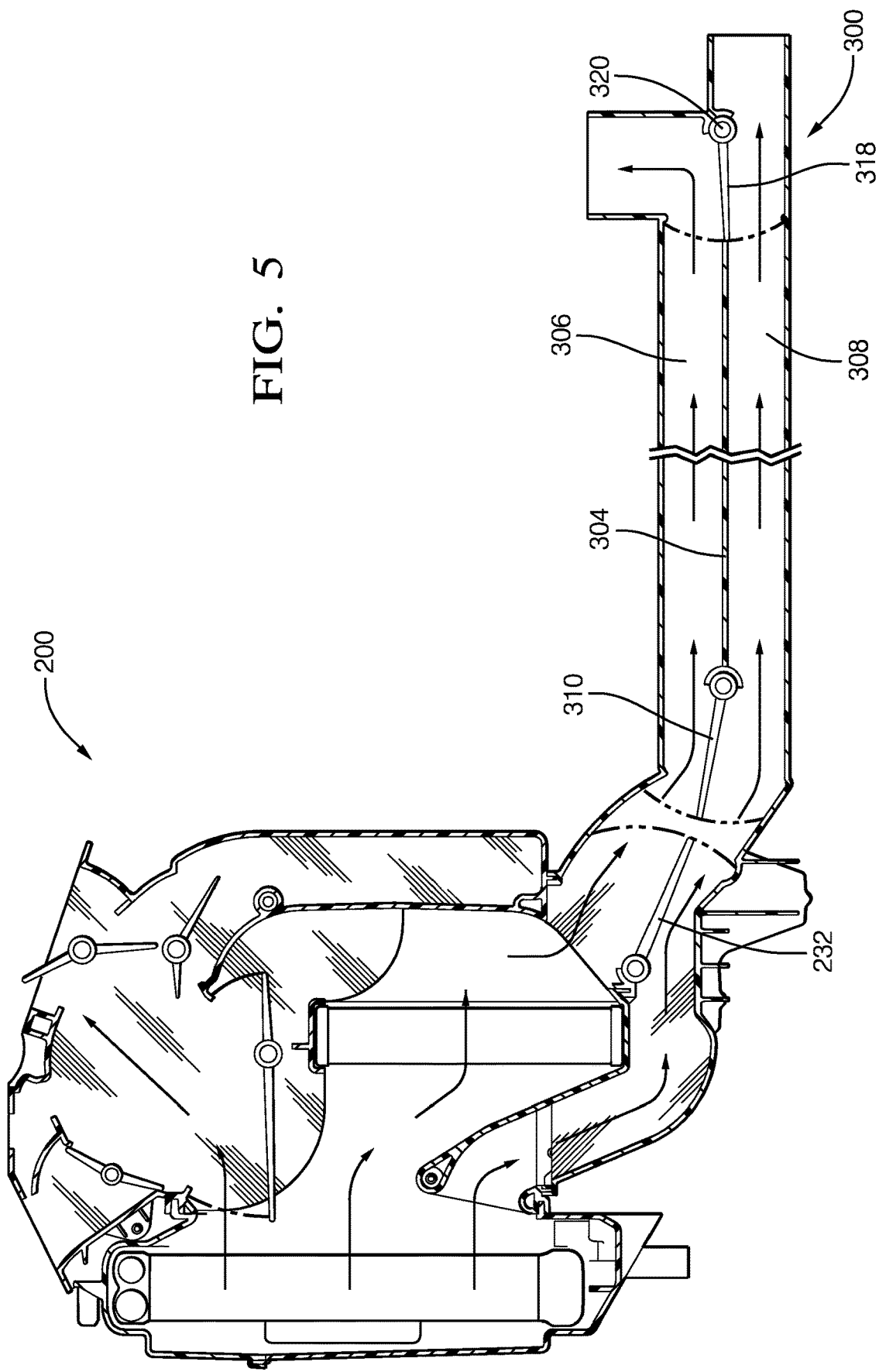
FIG. 5 is a cross-sectional view of an alternative embodiment of the HVAC module having a bi-level duct system.

For FIGS. 2-5, only the first air duct 302 is shown and described; the second air duct 303 is hidden from view behind the first air duct 302. FIG. 2-4 is a cross-sectional view of the HVAC module 200 having a bi-level duct system 300 of FIG. 1. The HVAC module 200 includes an HVAC housing 202 defining an air inlet 201, an interior cavity 203, and a lower air outlet 234 adjacent the lower portion of the HVAC housing 202. A blower assembly (not shown) is provided to induce air flow through the HVAC module 200 and the reconfigurable bi-level duct system 300. An evaporator 204 is disposed within the interior cavity 203 downstream from the air inlet 201 and a heater unit 206 is disposed downstream of the evaporator 204. A cold air chamber 226 is defined by the volume of the HVAC housing 202 between the evaporator 204 and the heater unit 206, and a hot air chamber 228 is defined by the volume of the HVAC housing 202 between the heater unit 206 and a portion of the interior surface of the HVAC housing 202 downstream of the heater unit 206.

The HVAC housing 202 further defines an air mix chamber 230 in downstream fluid communication with the cold air chamber 226 and hot air chamber 228. A blend valve 232 is disposed in the air mix chamber 230 for selectively directing airflow discharged from the cold and hot air chambers 226, 228 to the outlet 234 of the HVAC module 200. The blend valve 232 may be that of a flat plane valve 232 having a support arm rotatably secured at one end, the pivot end 236, to the housing of the HVAC module 200 and a distal end 238 opposite of the pivot end 236. The blend valve 232 may be actuated to move the distal end 238 through an arcuate path about the pivot end 236 to selectively restrict air flow from one of the cold and hot chambers while proportionally unrestricting air flow from the other of the cold and hot chambers to the outlet 234.

The bi-level air duct 300 includes an air duct inlet 305 in fluid communication with the air outlet 234 of the HVAC module 200. The reconfigurable bi-level air duct 300 further includes an interior wall 304 dividing the first air duct 302 into a first air passageway 306 and a second air passageway 308. The first air passageway 306 convey conditioned air flow to the lower portion of the rear passenger compartment and the second air flow passageway conveys conditioned air flow to the middle to upper portion of the rear passenger compartment.

An upstream control valve 310 is disposed adjacent the inlet of the air duct 301 and is configured to selectively direct air flow from the outlet 234 of the HVAC module 200 to both of the first and second air passageways of the air duct 301. Similarly to the blend valve 232, the upstream control valve 310 may be that of a flat plane valve 310 having a pivot end 312 and an opposite distal end 314. The pivot end 312 of the upstream control valve 310 may be spaced from the interior wall 304 such that the distal end 314 is immediately adjacent and align with the interior wall 304 when the upstream control valve 310 is in a neutral position as shown in FIG. 1. In this neutral position, air flow exiting the outlet 234 is equally partitioned into the first and second passageways 308 such that the first passageway 306 receives a greater portion of the air flow from the hot chamber than the second passageway 308, and the second passageway 308 receives a greater portion of the air flow from the cold chamber than the first passageway 306. This neutral configuration may be designed in such a way that provides approximately a 10° F. temperature differential for the air flow in the first passageway 306 as compared to the air flow in the second passageway 308.

To allow for selective air flow between the first and second air passageways downstream of the upstream control valve 310, a bypass port 316 is defined in the interior wall 304 and a downstream control valve 318 is disposed adjacent the bypass port 316. The downstream control valve 318 is configured to selectively direct air flow from one of the first and second air passageways to the other of the first and second air passageways. Also similar to the blend valve 232 and upstream control valve 310, the downstream control valve 318 may be that of a flat plane valve 318 having a pivot end 320 and an opposite distal end 322. The second flow control valve is further configured to selectively hermetically seal the bypass port 316 to prevent cross air flow between the first and second passageways 308.

Shown in FIG. 3, the position of the blend valve 232 may be selected to restrict air flow from the cold chamber and permit only air flow from the hot chamber to the duct 302. The upstream control valve 310 is placed in a position to permit the hot air flow to both the first and second air passageways and the downstream control valve 318 is placed in a first position to direct the air flow to the first passageway outlet. In this configuration, both passageways are used to deliver hot air to the lower portion of the vehicle rear compartment thereby enabling super heating of the rear zone. As an alternative (not shown), the downstream control valve 318 may be selected in a second position to direct the air flow to the second passageway outlet; thereby super heating to the middle to upper portion of the rear zone.

Shown in FIG. 4, the position of the blend valve 232 may be selected to restrict air flow from the hot chamber and permit only air flow from the cold chamber to the duct 301. The upstream control valve 310 is placed in a position to permit the cold air flow to both the first and second air passages and the downstream control valve 318 is placed in a second position to direct the air flow to the second passageway outlet. In this configuration, both passageways are used to deliver cold air to the middle to upper portion of the vehicle rear zone, thereby enabling super cooling of the rear zone. As an alternative (not shown), the downstream control valve 318 may be placed in a first position to direct the air flow to the first passageway outlet; thereby super cooling the lower portion of the rear zone.

In an alternative embodiment as shown in FIG. 5, the pivot end 312 of the upstream control valve 310 may be immediately adjacent the interior wall 304 and the opposite distal end 238 may be spaced from the interior wall 304 and movable through an arcuate path. The upstream control valve 310 may be configured to be rotatable in a neutral position such that a stratified layer of cold air flow from the cold chamber and a layer of hot air flow are directed into the mix chamber. The first flow control valve 310 is selected such that the plane valve is in a position as to minimally disturb the stratified layers of hot and cold air flows exiting the mix chamber such that a majority portion of hot air flow is directed into the first air passageway 306 and a majority portion of the layer of cold air flow is directed to the second air passageway 308. The temperature difference between the first air passageway and the second air passageway may be adjusted by moving the first flow control valve 310.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. An HVAC system comprising:
    an HVAC module having a cold air chamber, a hot air chamber, an air mix chamber downstream of and in fluid communication with the cold and hot air chambers, with apportioned air flows from the cold air chamber and from the hot air chamber entering the air mix chamber, an air outlet downstream of the air mix chamber and configured to deliver bi-level conditioned air to a rear passenger zones of a passenger vehicle, and a blend valve disposed in the air mix chamber, wherein the blend valve is configured to apportion the air flows from both the cold and hot air chambers to the air mix chamber;
    an air duct assembly of two air ducts, composed of a left air duct and a right air duct, downstream of the air outlet, configured to deliver the conditioned air from the air outlet to the rear passenger zone and having an air duct inlet at the air outlet of the HVAC module, wherein each of the two air ducts includes:
    an interior wall dividing the air duct into a first air passageway and a second air passageway, forming a total of four air passageways configured to extend to the rear passenger zone;
    a respective bypass port in the interior wall of each of the two air ducts, wherein the bypass port enables fluid communication between the first air passageway and the second air passageway; and
    a respective downstream control valve in each of the two air ducts, the downstream control valve controlling the bypass port, wherein the downstream control valve is configured to selectively direct air flow from one of the first and second air passageways to the other one of the first and second air passageways, and
    a respective upstream flow control valve associated with each of the two air ducts in the air outlet of the mix chamber and upstream of the interior wall, wherein the upstream flow control valve is configured to selectively direct air flow from the outlet toward the first and second air passageways of the associated air duct and has a neutral position, in which the upstream flow control valve is aligned with and forms an extension of the interior wall, and in which air flow from the mix chamber exiting the outlet is equally partitioned into the first and second passageways.

2. The HVAC system of claim 1, wherein the downstream control valve is further configured to selectively hermetically close the bypass port.

3. The HVAC system of claim 1, wherein the blend valve is configured to be selectable in a neutral position in which the blend valve directs a stratified layer of cold air flow from the cold chamber and a layer of hot air flow into the mix chamber and to the outlet.

4. The HVAC system of claim 3, wherein in the neutral position, the upstream flow control valve directs a majority portion of the layer of hot air flow into the first air passageway and a majority portion of the layer of cold air flow to the second air passageway.

5. The HVAC system of claim 3, wherein the blend valve is selectable to direct cold air flow from the cold chamber to the mix chamber and restrict hot air flow from the hot chamber, the upstream flow control valve is selectable to direct the cold air flow to the first and second air passageways, and the downstream control valve is selectable to direct the cold stream to the second air passageway.

6. The HVAC system of claim 3, wherein the blend valve is selectable to direct hot air flow from the hot chamber to the mix chamber and restrict cold air flow from the cold chamber, the upstream flow control valve is selectable to direct the hot air flow to the first and second air passageways, and the downstream control valve is selectable to direct the hot stream to the first air passageway.

7. The HVAC system of claim 4, wherein the upstream flow control valve is a plane valve having a pivot point adjacent the interior wall and a distal end directed toward the mix chamber of the HVAC module.

8. The HVAC system of claim 1, wherein the upstream flow control valve is a plane valve having a pivot point spaced from the interior wall and a distal end adjacent to the interior wall when the upstream flow control valve is in the neutral position.

9. An HVAC system comprising:
an HVAC module defining an air outlet configured to deliver conditioned air from the air outlet to a rear passenger zone, wherein the outlet is a shared outlet for both heated air and cooled air; and
a duct assembly of two ducts downstream of and in fluid communication with the air outlet of the HVAC module;
wherein each of the two ducts, composed of a left duct and a right duct, includes an internal wall partitioning the duct into a first air passageway and a second air passageway, the internal wall extending inside the duct to the rear passenger zone so that both first and second passageways of both of the two ducts extend to the rear passenger zone, and
wherein the internal wall defines a bypass port enabling fluid communication between the first air passageway and the second air passageway inside the duct,
wherein each of the two ducts includes a downstream valve downstream of the HVAC module, controlling the bypass port, wherein the downstream valve is configured to selectively direct air flow from one of the first and second air passageways to the other one of the first and second air passageways
wherein each of the two ducts further includes an associated upstream valve downstream of the air outlet, upstream of the downstream valve, and adjacent to the inlet of the associated duct, wherein the upstream flow control valve is configured to selectively direct air flow from the outlet to the first and second air passageways of the associated duct.

10. The HVAC system of claim 9, wherein the downstream valve is configured to be selectable in a first position to hermetically seal the bypass port.

11. The HVAC system of claim 10, wherein the downstream valve is configured to be selectable in a second position to enable air flow from the first air passageway to the second air passageway.

12. The HVAC system of claim 11, wherein the downstream valve is configured to be selectable in a third position to enable air flow from the second air passageway to the first air passageway.

13. The HVAC system of claim 12, wherein the upstream flow control valve has a first position enabling air flow from the outlet to both of the first and second air passageways.

14. The HVAC system of claim 13, wherein the upstream valve is a plane valve having a pivot point adjacent the first and second air passageways, and a distal end movable in an arch to restrict air flow to one of the first and second air passageways while unrestricting air flow to the other of the first and second air passageways.

15. The HVAC system of claim 13, wherein the upstream valve is a plane valve having a pivot point spaced from the first and second air passageways, and a distal end movable in an arch directing air flow to both the first and second air passageways.

16. The HVAC system of claim 15, wherein the upstream valve is selected in the first position and the downstream valve is selected in the first position.

17. The HVAC system of claim 15, wherein the upstream valve is selected in the first position and the downstream valve is selected in the second position.

18. The HVAC system of claim 9, wherein the upstream valve has a first position enabling air flow from the outlet to both of the first and second air passageways, the first position being a neutral position, in which the upstream valve is aligned with and forms an extension of the interior wall, and in which air flow exiting the outlet is equally partitioned into the first and second passageways.

* * * * *